United States Patent
Wildner

(10) Patent No.: US 6,776,134 B2
(45) Date of Patent: Aug. 17, 2004

(54) MONITORING THE FUNCTIONING OF A CYLINDER CUT-OFF IN INTERNAL COMBUSTION ENGINES HAVING MULTIPLE CYLINDERS

(75) Inventor: Oliver Wildner, Sersheim (DE)

(73) Assignee: Robert Bosch GmbH, Stuttgart (DE)

( * ) Notice: Subject to any disclaimer, the term of this patent is extended or adjusted under 35 U.S.C. 154(b) by 34 days.

(21) Appl. No.: 10/168,410

(22) PCT Filed: Dec. 29, 2000

(86) PCT No.: PCT/DE00/04650
§ 371 (c)(1),
(2), (4) Date: Jun. 20, 2002

(65) Prior Publication Data
US 2002/0189576 A1 Dec. 19, 2002

(30) Foreign Application Priority Data
Dec. 29, 1999 (DE) .......................... 199 63 638

(51) Int. Cl.⁷ .................................. F01L 1/34
(52) U.S. Cl. ................. 123/198 F; 123/90.15
(58) Field of Search ............... 123/198 F, 481, 123/90.11, 90.15; 73/118.1, 118.2, 116

(56) References Cited

U.S. PATENT DOCUMENTS

| | | | |
|---|---|---|---|
| 5,033,290 A | * | 7/1991 | Seki et al. ................. 73/118.1 |
| 5,549,080 A | | 8/1996 | Uchikawa |
| 5,644,073 A | | 7/1997 | Matsuno et al. |
| 6,213,068 B1 | * | 4/2001 | Hassdenteufel .......... 123/90.15 |

FOREIGN PATENT DOCUMENTS

| | | |
|---|---|---|
| DE | 196 06 584 | 10/1996 |
| EP | 0 399 829 | 11/1990 |

* cited by examiner

Primary Examiner—Tony M. Argenbright
Assistant Examiner—Hyder Ali
(74) Attorney, Agent, or Firm—Kenyon & Kenyon

(57) ABSTRACT

A method is described for monitoring the temporary cut-off function of the gas exchange valves of individual cylinders or cylinder groups in internal combustion engines, in which the gas exchange valves of the cylinders to be temporarily cut off are deactivated in the closed state for the duration of the cutoff. Two signals, which supply a measure for the air mass flowing into the internal combustion engine, are compared for monitoring purposes. A disproportion between both signals is interpreted as a fault in the described chain of action.

3 Claims, 2 Drawing Sheets

MONITORING THE FUNCTIONING OF A CYLINDER CUT-OFF IN INTERNAL COMBUSTION ENGINES HAVING MULTIPLE CYLINDERS

FIELD OF THE INVENTION

The present invention relates to monitoring the cut-off function of individual cylinders or cylinder groups in internal combustion engines having multiple cylinders.

BACKGROUND INFORMATION

In multi-cylinder internal combustion engines, individual cylinders or cylinder groups are conventionally cut off during partial engine operation, in other words, switched between full engine operation using all cylinders, and partial engine operation using only a part of the cylinders, such as only one cylinder group of a V-engine. As a result of the cut-off, the remaining cylinders which are still operating in partial engine operation are operated with increased cylinder charge when compared to full engine operation, and thus at improved efficiency, resulting in better fuel consumption.

The cut-off may be implemented, for instance, by deactivating the gas exchange valves, e.g., those valves controlling the change of the cylinder charge. For example, the intake valve as well as the exhaust valve of the particular cylinder are closed for the duration of the deactivation to effect the cut-off.

In this context, a particular problem may arise that in those cases where full engine operation is desired, the gas exchange valves of one or more cylinders are incorrectly deactivated. Likewise, the opposite error may occur; the gas exchange valves of one or more of the cylinders to be cut off are not properly deactivated when partial engine operation is desired.

SUMMARY

An example embodiment of the present invention makes it possible to monitor whether the valves of the cylinders capable of being shut off are properly activated during full engine operation, and whether, in partial engine operation, the valves of the cylinders to be shut off are properly deactivated.

This allows, for instance, in the case of undesirably deactivated gas exchange valves, to additionally cut off the fuel injection of the respective cylinders, so that an over-enrichment of the fuel/air mixture for the remaining cylinders may be prevented.

If no counter-measures were taken when the gas exchange valves are undesirably activated, the fuel injection of the cylinders to be cut off would be properly switched off. The undesirably active gas exchange valves cause an undesired rate of airflow through the cylinders to be cut off, which is effectively missing in the properly functioning cylinders. Since the control device calculates the fuel quantity for the properly functioning cylinders as if they were to process the entire air quantity, these cylinders are metered too much fuel, which results in deterioration in the emission behavior and in the performance of the internal combustion engine. Here, too, the amount of fuel metered to the properly working cylinders may be corrected as a counter measure.

DETAILED DESCRIPTION

Figure 1:
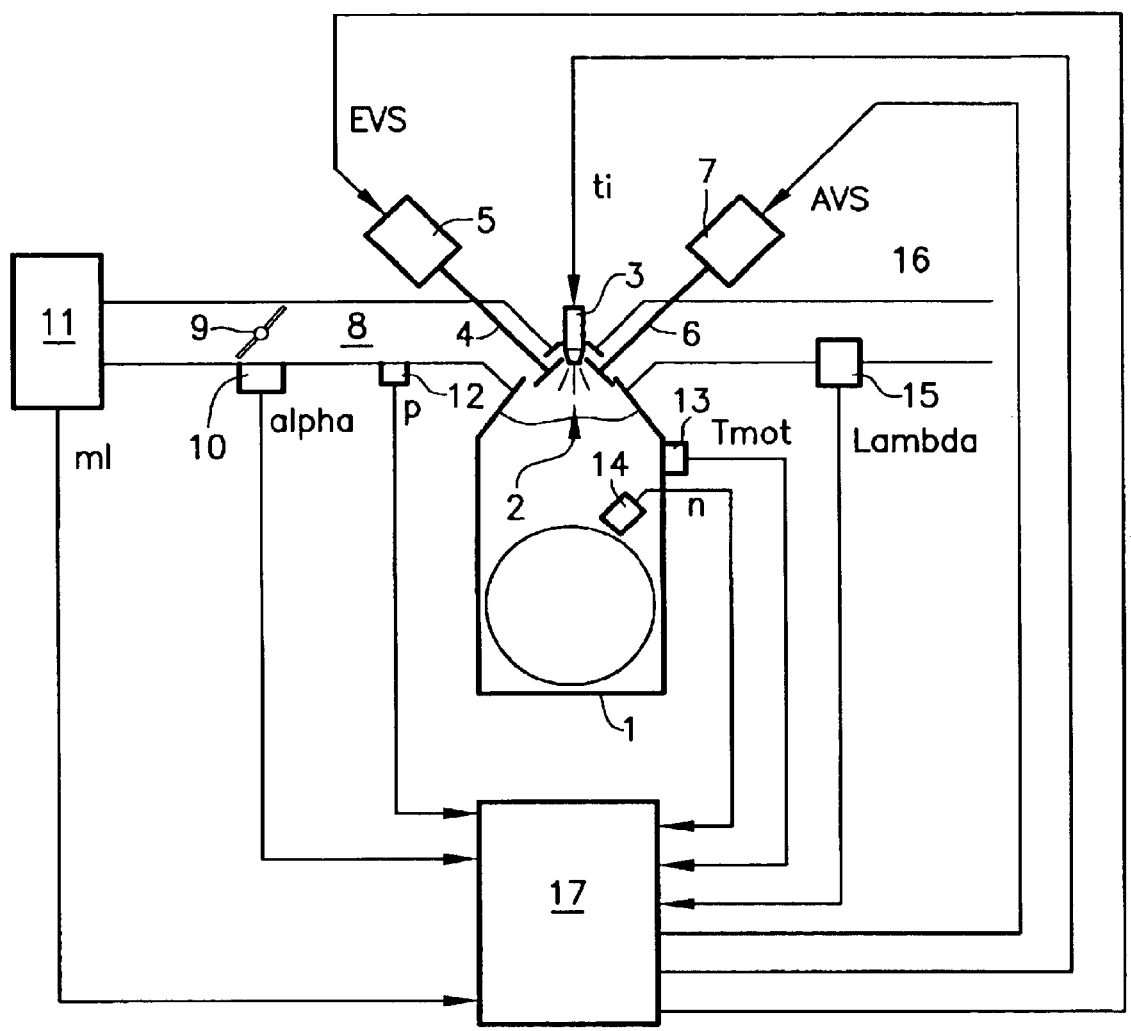
FIG. 1 shows the technical field of the present invention.

In FIG. 1, "1" represents an internal combustion engine having a combustion chamber 2, fuel injector 3, intake valve 4, intake valve actuator 5, exhaust valve 6, exhaust valve actuator 7, intake manifold 8, throttle valve 9, sensor 10 for throttle valve angle alpha, air mass flow meter 11, intake manifold pressure sensor 12, engine temperature sensor 13, speed sensor 14 and lambda sensor 15 in exhaust pipe 16, as well as an electronic control device 17.

The electronic control device processes the signals shown concerning intake-air mass ML, throttle valve opening angle α, intake manifold pressure p, engine temperature tmot, rotational speed n and fuel/air mixture composition lambda, to form control signals for the internal combustion engine, for instance, to form fuel injection pulse widths ti, ignition signals etc. In FIG. 1, the control device also generates signals EVS and AVS, which determine the activation and deactivation of gas exchange valves 4 and 6, and thereby the cylinder cut-off. The specific implementation of the valve actuation, whether hydraulic, mechanical, or controllable either individually or as a group, is not decisive. In any case, however, the control device can activate and deactivate the intake and exhaust valves.

Figure 2:
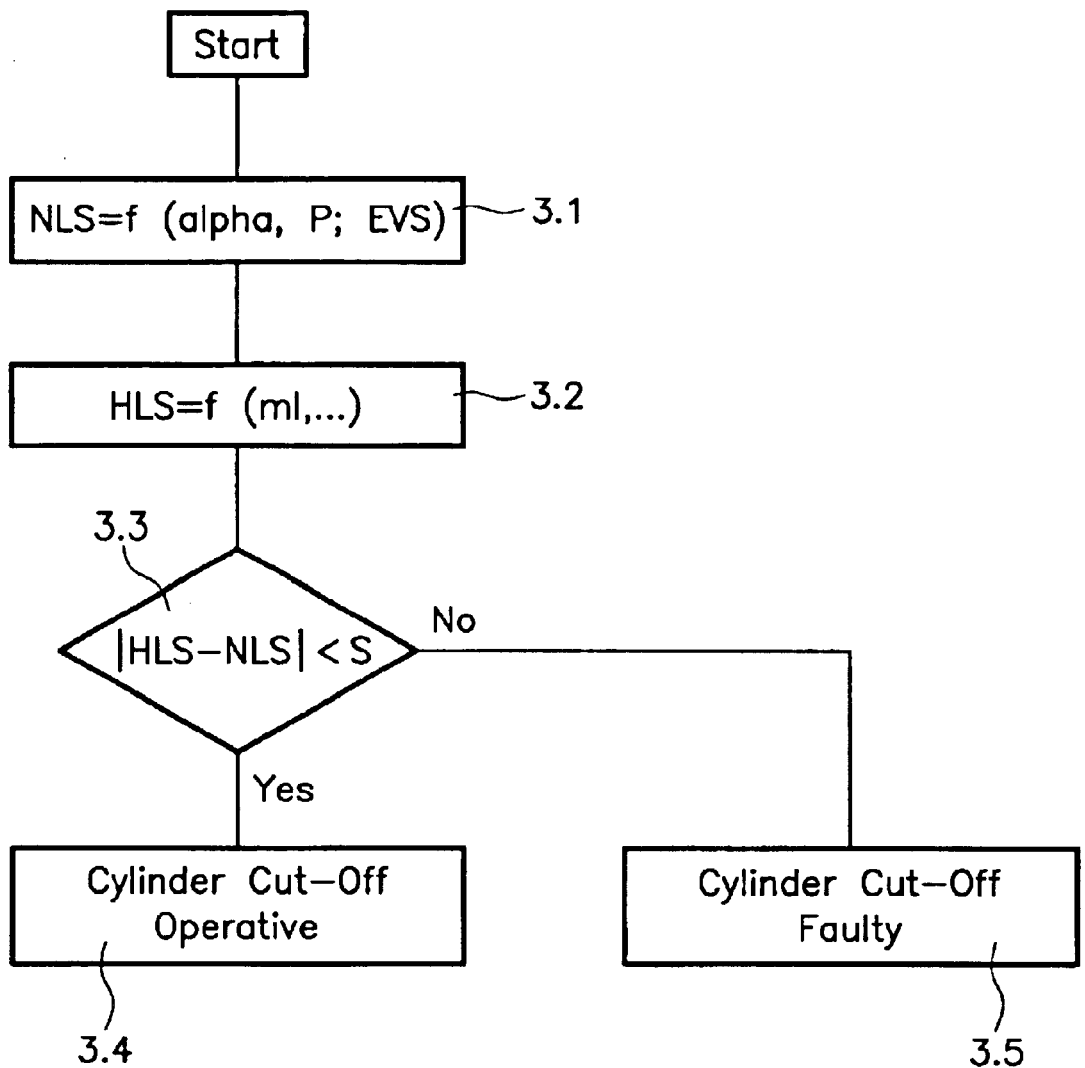
FIG. 2 shows a flow chart as an exemplary embodiment of the method of the present invention.

FIG. 2 shows an exemplary embodiment of the method of the present invention. After the diagnostic program is launched, in step 3.1, a first signal NLS for the air mass flowing into the internal combustion engine is formed from throttle opening angle a and signals EVS, AVS about the activation of the gas exchange valves.

In step 3.2, a second signal HLS for the air mass flowing into the internal combustion engine is formed from intake-air mass ML. The sequence for forming of NLS and HLS may also be reversed. In step 3.3, the amount of the difference is calculated from the first and second air mass signals and its absolute value is compared with a threshold value S. If, for example, the difference amount is smaller than the threshold value, the cylinder cut-off function is deemed operative (step 3.4). If the amount is greater than the threshold value, an error message is generated in step 3.5.

Instead of using the difference, it is also possible to compare a quotient, derived from signals HLS and NLS, to a predefined reference value. If the quotient is approximately 1, the cylinder cut-off function is operative.

A significant deviation from value 1 signals a malfunction in the activation or deactivation of the cylinders. The extent of the deviation, which allows differentiation between an operative and a malfunctioning cylinder cut-off function, can be determined by bench testing and stored in electronic control device 17 for later use during the operation of the internal combustion engine.

The generation of the first air mass signal is based on the assumption that the cylinder cut-off function is operative. If the cylinder cut-off function is indeed operative, the first air mass signal derived from throttle opening angle alpha and control signals EVS, AVS, will then also correctly reflect the actual cylinder charge. It is also possible to take intake-manifold pressure p into consideration in forming the first air mass signal, either alternatively or in addition to throttle valve angle alpha. Engine speed n may also be considered in forming the first air mass signal, but only additionally, not alternatively. The actual cylinder charge is also reflected in second air mass signal HLS, irrespective of which control signals EVS, AVS are used in the electronic control device. In other words: optimally, if the valve control is operative, the first and second air mass signals do not differ, which, via step 3.3, leads to the result of step 3.4.

According to the present embodiment of the present invention, for monitoring purposes, two signals which supply a measure of the air mass flowing into the internal combustion engine are thus compared.

The second signal is provided by an air mass flow sensor, such as a hot-wire or hot-film air mass flow sensor. This signal represents the air actually flowing into the internal combustion engine, be it during full engine operation or during partial engine operation.

The first signal, for instance, is formed by taking into account the intake manifold pressure, the rotational speed and the number of the desirably active cylinders. At a given speed and pressure, for example, the air mass flowing into the engine will be greater during full engine operation than in partial engine operation.

In the above-described fault situations, a disproportion exists between the air mass signal calculated from the signal of the air mass meter and the air mass signal calculated from the intake-manifold pressure. To detect the disproportion, the quotient of both signals is low-pass filtered in each engine operating mode and compared with a threshold. The respective fault is set if this threshold is exceeded or undershot. For instance, if the air mass calculated from the intake-manifold pressure constitutes the numerator and the measured air mass the denominator, and if some cylinders are undesirably deactivated, the quotient will be greater than expected. In contrast, if some of the cylinders to be cut off are undesirably active, the quotient will be smaller than expected.

In one exemplary embodiment of the present invention, a fault might be inferred if, during desired full engine operation, the quotient is greater than expected, the fault being verified through an analysis of the irregular running of the internal combustion engine. The analysis of the irregular running can be carried out by evaluating the fluctuations in the angular velocity of the crankshaft, and may also be additionally used to identify the affected cylinder. The undesired deactivation of the gas exchange valves of the affected cylinder during desired full engine operation causes a loss of the torque contribution of this cylinder, which occurs periodically and which periodically brakes, or fails to accelerate, the crankshaft. The position of the missing acceleration relative to a reference angle of the crankshaft, such as the dead center of the piston of the first cylinder during the power stroke, makes it possible to identify the affected cylinder and thus allows a controlled cut-off of the fuel supply to this cylinder. In modern motor vehicles, an evaluation of the irregular running is already being carried in order to comply with legal requirements relating to on-board diagnosis of faults relevant to the exhaust gas system, such as combustion misses in the operation of the internal combustion engines used as automotive propulsion.

What is claimed is:

1. A method for monitoring a temporary cut-off function of gas exchange valves of an individual cylinder or cylinders group in an internal combustion engine, gas exchange valves of cylinders to be temporarily cut off being deactivated in a closed state for a duration of the cut-off, the method comprising:

comparing two signals which provide a measure for an air mass flowing into the internal combustion engine; and determining a malfunction of the temporary cut-off function if a disproportion is detected between the two signals;

wherein a first one of the two signals is provided by an air mass meter, and a second one of the two signals is formed as a function of an intake manifold pressure, a speed, and a number of cylinders desired to be active.

2. The method according to claim 1, wherein the air mass meter is a hot-wire or hot-film air mass meter.

3. The method according to claim 1, further comprising:

detecting a disproportion by low-pass filtering a quotient between the two signals in each engine operating mode and comparing the quotient to a threshold.

* * * * *